United States Patent
Pomerantz

Patent Number: 5,897,626
Date of Patent: Apr. 27, 1999

[54] TAXIMETER PENALTY DEVICE

[76] Inventor: David Pomerantz, 251 174th St., Apt. 504, Miami Beach, Fla. 33160

[21] Appl. No.: 08/951,321

[22] Filed: Oct. 16, 1997

[51] Int. Cl.[6] .......................... G07B 13/10; G07B 13/08; G07B 13/00

[52] U.S. Cl. .......................... 705/417; 235/30 R; 235/33; 705/400

[58] Field of Search .................................. 235/30 R, 33; 705/13, 400, 417, 418

[56] References Cited

U.S. PATENT DOCUMENTS

| | | | |
|---|---|---|---|
| 3,843,874 | 10/1974 | Kelch | 235/150.2 |
| 3,860,806 | 1/1975 | Fichter et al. | 235/168 |
| 4,001,560 | 1/1977 | Larsen | 235/151.32 |
| 4,217,484 | 8/1980 | Gerst | 235/92 DN |
| 4,539,644 | 9/1985 | Adams et al. | 364/467 |

OTHER PUBLICATIONS

Argo 1144 Mini Meter information sheet downloaded from the Internet.
Pulsar 2010 Power Meter and Pulsar 2010R Receipt Meter information sheet downloaded from the Internet.
Centrodyne Silent 610 and 620 information sheet downloaded from the Internet.

*Primary Examiner*—Edward R. Cosimano
*Attorney, Agent, or Firm*—Jack Lo

[57] ABSTRACT

A taximeter penalty device includes a cabin temperature sensor connected to a micro-controller of a taximeter through a time delay. When the cabin temperature of the taxi is within a preset range, the fare is based on a normal rate. When the temperature is outside the range, such as when the cabin is too hot or cold, a lower rate is used. An alternative fare calculation method includes subtracting a penalty from the normal rate. A grace period is provided by the time delay, so that the taxi driver can adjust the temperature to avoid the penalty. The taximeter penalty device thus induces the taxi driver to provide better service.

15 Claims, 2 Drawing Sheets

TAXIMETER PENALTY DEVICE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to taximeters.

2. Prior Art

A taximeter is a device for calculating and displaying a taxi fare based on one or more variables, such as distance traveled and waiting time. Various taximeters are disclosed in U.S. Pat. Nos. 4,539,644 to Adams; 4,217,484 to Gerst; 4,001,560 to Larsen; 3,860,806 to Fichter; and 3,843,874 to Kelch. Some taxi drivers tend to not use the climate control system in their vehicles, so that their passengers have to suffer very hot or cold temperatures. However, these drivers are paid the same fare even when providing such poor service.

OBJECTS OF THE INVENTION

Accordingly an object of the present invention is to provide a taximeter penalty device that penalizes a taxi driver for uncomfortably hot or cold cabin temperatures by reducing the taxi fare, so as to induce the taxi driver to provide better service.

Another object of the present invention is to provide a taximeter penalty device that reduces the taxi fare after a grace period.

Further objects of the present invention will become apparent from a consideration of the drawings and ensuing description.

BRIEF SUMMARY OF THE INVENTION

A taximeter penalty device includes a cabin temperature sensor connected to a micro-controller of a taximeter through a time delay. When the cabin temperature of the taxi is within a preset range, the fare is based on a normal rate. When the temperature is outside the range, such as when the cabin is too hot or cold, a lower rate is used. An alternative fare calculation method includes subtracting a penalty from the normal rate. A grace period is provided by the time delay, so that the taxi driver can adjust the temperature to avoid the penalty. The taximeter penalty device thus induces the taxi driver to provide better service.

DETAILED DESCRIPTION OF THE INVENTION

Figure 1:
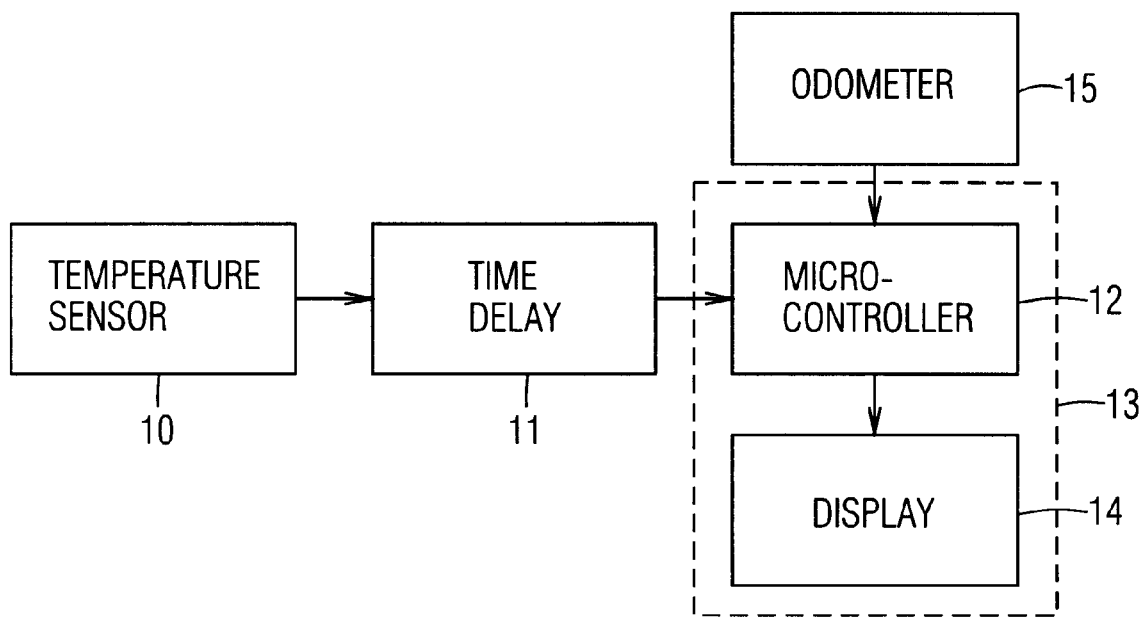
FIG. 1 is a block diagram of a taximeter penalty device in accordance with the invention.

FIG. 1:

In accordance with a preferred embodiment of the invention shown in the block diagram of FIG. 1, a taximeter penalty device includes a digital, environmental condition or temperature sensor 10 connected through a time delay 11 to a micro-controller 12 of a conventional taximeter 13, which is shown simplified. Temperature sensor 10 may be mounted anywhere in the passenger cabin of a taxi. A delay is introduced by time delay 11 in the flow of digital temperature information to micro-controller 12, so as to provide a grace period for a taxi driver to adjust the cabin temperature of the taxi. The delay may be preset at the factory, or it may be user adjustable. Micro-controller 12 is conventionally programmed for displaying a taxi fare on a display 14 according to one or more variable inputs. Only an odometer 15 is shown as an input for simplicity. The detailed construction and operation of a conventional taximeter is readily understood by anyone skilled in the art.

Figure 2:
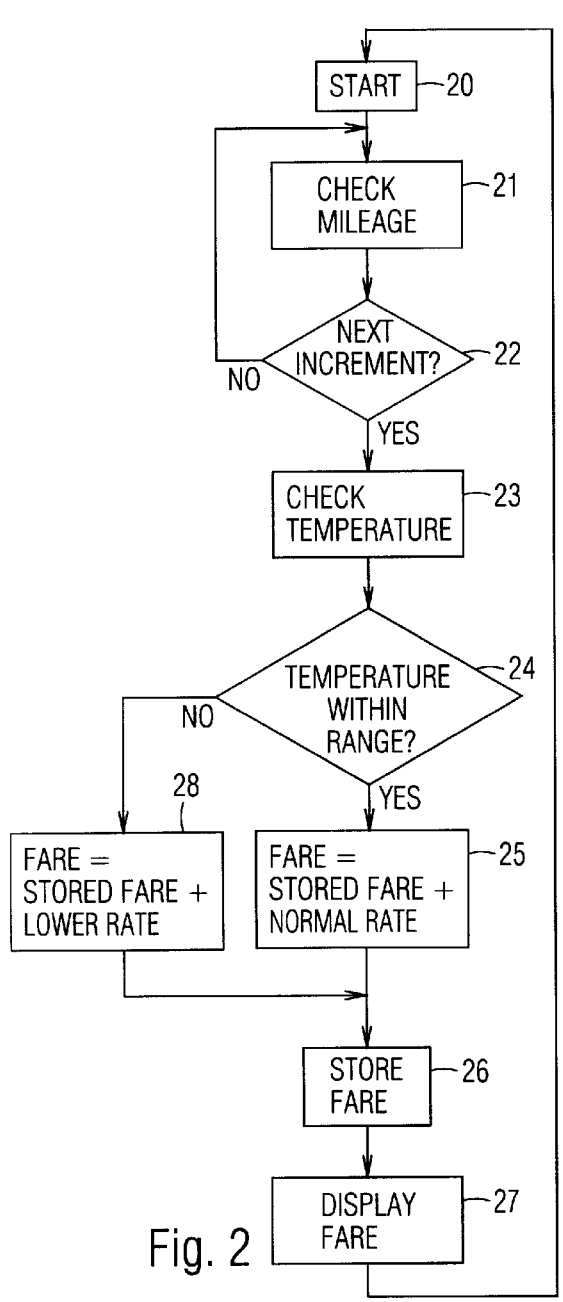
FIG. 2 is a flowchart of a process flow of the taximeter penalty device.

FIG. 2:

The conventional programming of micro-controller 12 (FIG. 1) is modified according to the flowchart in FIG. 2. When a taxi ride is begun, the taximeter is started at block 20. The mileage traveled is checked at block 21. If a predetermined mileage billing increment, e.g., 0.1 mile, is not exceeded at block 22, the process flow is returned to block 21. If the increment is exceeded, the temperature is checked at block 23. If at block 24 the measured temperature is within a predetermined range, e.g., between and including 65 and 70 degrees Fahrenheit, the current fare is calculated by adding a previously stored fare to a normal rate for the mileage increment at block 25. For example, at the beginning of a ride, the stored fare is $0.00, and a $0.25 fare for the first 0.1 mile is added to the stored fare of $0.00, for a current fare of $0.25. At 0.2 mile, the $0.25 fare for the second 0.1 mile increment is added to the stored fare of $0.25, for a current fare of $0.50. The current fare is stored at block 26, and displayed at block 27. The process is returned to block 20, so that the fare is continuously updated. The temperature range may be set at the factory, or it may be user programmable with a keypad or dial.

If the temperature is outside the preset range, such as when the taxi is uncomfortably hot or cold, the current fare is calculated by adding the stored fare to a lower rate at block 28. For example, during the first 1.1 miles, the temperature is within range, but between 1.1 miles and 1.2 miles, the temperature is outside the range. The stored fare for the first 1.1 miles is $2.75. A lower rate of $0.15 for the latest mileage increment is added to the stored fare of $2.75 for a current fare of $2.90. The current fare is stored at block 26 and displayed at block 27. The process flow is returned to block 20, so that the fare is continuously updated. Incrementing the fare at a lower rate thus penalizes the taxi driver for failure to maintain a comfortable cabin temperature.

Figure 3:
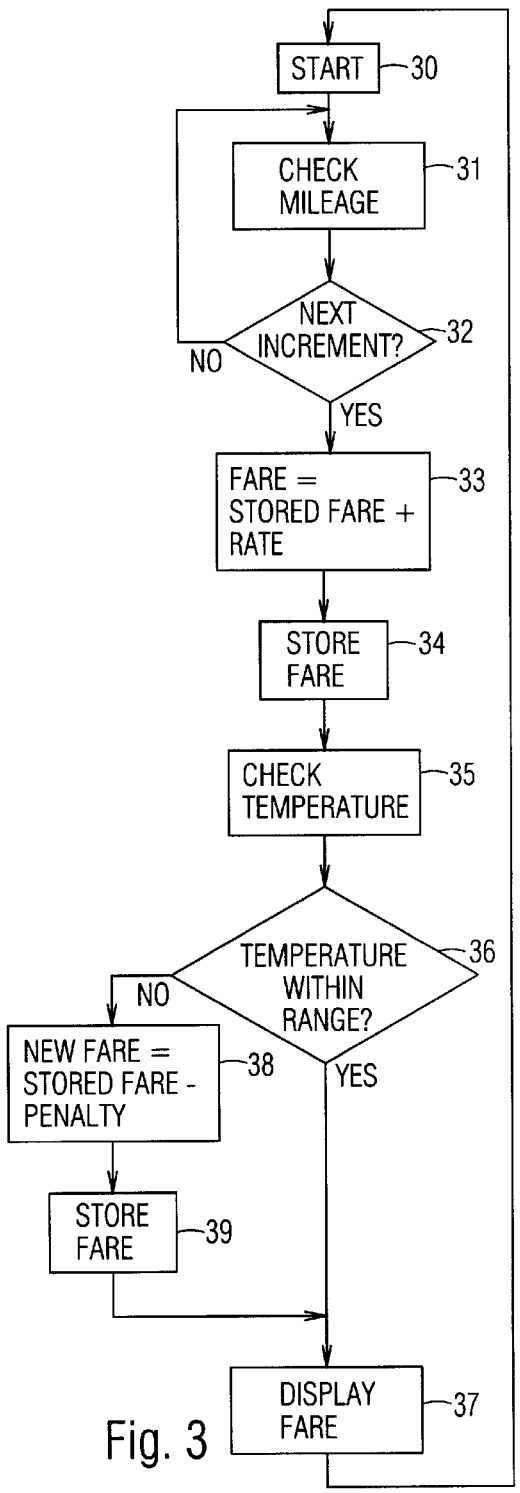
FIG. 3 is a flowchart of an alternative process flow of the taximeter penalty device.

FIG. 3:

An alternative process flow for the programming of micro-controller 12 (FIG. 1) is shown in the flowchart in FIG. 3. When a taxi ride is begun, the taximeter is started at block 30. The mileage traveled is checked at block 31. If a predetermined mileage billing increment, e.g., 0.1 mile, is not exceeded at block 32, the process flow is returned to block 31. If the increment is exceeded, the current fare is calculated by adding a previously stored fare to a rate for the mileage increment at block 33. The current fare is stored at block 34. The temperature is checked at block 35. If at block 36 the measured temperature is within a predetermined range, e.g., between and including 65 and 70 degrees Fahrenheit, the fare is displayed at block 37. The process flow is returned to block 30, so that the fare is continuously updated.

If the temperature is outside the preset range, such as when the taxi is uncomfortably hot or cold, the current fare is calculated by subtracting a penalty from the stored fare at block 38. For example, during the first 1.1 miles, the temperature is within range, but between 1.1 miles and 1.2 miles, the temperature is outside the range. The fare for the first 1.2 miles is $3.00. A penalty of $0.10 is subtracted from the fare of $3.00 for a new fare of $2.90. The new fare is stored at block 39 and displayed at block 37. The process flow is returned to block 30, so that the fare is continuously updated. Subtracting a penalty from the fare thus penalizes the taxi driver for failure to maintain a comfortable cabin temperature.

Summary and Scope

Accordingly, a taximeter penalty device has been provided. It reduces the taxi fare for uncomfortably hot or cold temperatures, and it reduces the taxi fare after a grace period to give a taxi driver enough time to adjust the temperature. The taximeter penalty device thus induces the taxi driver to provide better service.

Although the above description is specific, it should not be considered as limitations on the scope of the invention, but only as an example of the preferred embodiments. Many substitutes and variations are possible within the teachings of the invention. For example, a variety of temperature sensors and taximeters can be used. The time delay can be implemented in the software of the micro-controller, or it can be eliminated. The taximeter may calculate the fare based on additional variables, such as waiting time in traffic. The penalty may be based on temperature and time, for example, a penalty may be subtracted from the fare for every minute that the temperature is outside the preset range. Other process flows may be used to calculate the fare. Instead of being built into or connected to a taximeter, the penalty device may be a separate meter. The penalty rate may be increased for greater deviations from the acceptable range of temperatures. A penalty may be levied for other uncomfortable environmental conditions. A visual or audible alarm may be provided to alert the driver when the temperature is outside the preset range. Therefore, the scope of the invention should be determined by the appended claims and their legal equivalents, not by the examples given.

I claim:

1. A taximeter penalty device, comprising:
   an environmental condition sensor for sensing an environmental condition within a taxi; and
   a taximeter connected to said environmental condition sensor, said taximeter calculating a penalty when said environmental condition is outside a selected comfortable range.

2. The taximeter penalty device of claim 1, wherein said environmental condition sensor comprises a temperature sensor.

3. The taximeter penalty device of claim 1, wherein said taximeter calculates a taxi fare by using a first rate when said environmental condition is within said comfortable range, and using a lower rate when said environmental condition is outside said comfortable range, said penalty being a difference between said first rate and said lower rate.

4. The taximeter penalty device of claim 1, wherein said taximeter calculates a taxi fare by subtracting said penalty from a first rate.

5. The taximeter penalty device of claim 1, further including a display connected to said taximeter for displaying a taxi fare after including said penalty.

6. A taximeter penalty device, comprising:
   an environmental condition sensor for sensing an environmental condition within a taxi; and
   a taximeter connected to said environmental condition sensor, said taximeter calculating a penalty after said environmental condition has been outside a selected comfortable range for a selected time delay period.

7. The taximeter penalty device of claim 6, wherein said environmental condition sensor comprises a temperature sensor.

8. The taximeter penalty device of claim 6, wherein said taximeter calculates a taxi fare by using a first rate when said environmental condition is within said comfortable range, and using a lower rate when said environmental condition is outside said comfortable range for said selected time delay period, said penalty being a difference between said first rate and said lower rate.

9. The taximeter penalty device of claim 6, wherein said taximeter calculates a taxi fare by subtracting said penalty from a first rate.

10. The taximeter penalty device of claim 6, further including a display connected to said taximeter for displaying a taxi fare after including said penalty.

11. A method for penalizing a taxi driver for failure to provide a comfortable environment in a taxi, comprising the steps of:
    sensing an environmental condition within said taxi; and
    calculating a penalty when said environmental condition is outside a selected comfortable range.

12. The method of claim 11, wherein said environmental condition comprises temperature.

13. The method of claim 11, wherein a taxi fare is calculated by using a first rate when said environmental condition is within said comfortable range, and using a lower rate when said environmental condition is outside said comfortable range, said penalty being a difference between said first rate and said lower rate.

14. The method of claim 11, wherein a taxi fare is calculated by subtracting said penalty from a first rate.

15. The method of claim 11, further including displaying a taxi fare after including said penalty.

\* \* \* \* \*